United States Patent
Kouno

(10) Patent No.: US 7,911,447 B2
(45) Date of Patent: Mar. 22, 2011

(54) INFORMATION PROCESSING DEVICE FOR CONTROLLING OBJECT BY USING PLAYER IMAGE AND OBJECT CONTROL METHOD IN THE INFORMATION PROCESSING DEVICE

(75) Inventor: Tsutomu Kouno, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1036 days.

(21) Appl. No.: 11/630,748

(22) PCT Filed: Jun. 28, 2005

(86) PCT No.: PCT/JP2005/011777
§ 371 (c)(1),
(2), (4) Date: Dec. 21, 2006

(87) PCT Pub. No.: WO2006/003869
PCT Pub. Date: Jan. 12, 2006

(65) Prior Publication Data
US 2008/0030459 A1 Feb. 7, 2008

(30) Foreign Application Priority Data
Jun. 30, 2004 (JP) ................................. 2004-194815

(51) Int. Cl.
*G09G 5/08* (2006.01)
(52) U.S. Cl. ................ 345/158; 345/8; 345/156; 463/1; 715/700
(58) Field of Classification Search .............. 345/8, 158; 463/1–8; 715/700
See application file for complete search history.

(56) References Cited

U.S. PATENT DOCUMENTS

| 4,988,981 | A | * | 1/1991 | Zimmerman et al. | 345/158 |
| 5,594,469 | A | * | 1/1997 | Freeman et al. | 345/158 |
| 5,616,078 | A | * | 4/1997 | Oh | 463/8 |
| 6,088,018 | A | * | 7/2000 | DeLeeuw et al. | 345/156 |
| 2002/0060648 | A1 | * | 5/2002 | Matsui et al. | 345/8 |
| 2002/0151337 | A1 | * | 10/2002 | Yamashita et al. | 463/8 |

FOREIGN PATENT DOCUMENTS

JP  200130712  * 2/2001

(Continued)

OTHER PUBLICATIONS

International Search Report dated Sep. 13, 2005 for corresponding PCT/JB2005/011777.

(Continued)

*Primary Examiner* — Alexander Eisen
*Assistant Examiner* — Viet Pham
(74) *Attorney, Agent, or Firm* — Katten Muchin Rosenman LLP

(57) ABSTRACT

An information processing device includes: detection means for detecting an area having motion from a mirror moving picture from a player; control means for creating a computer image containing an object too be moved; and display control means for causing a display device to display a superimposed moving image obtained by superimposing the mirror moving picture and the computer image. The control means sets a plurality of areas to be detected for the object to be moved and controls the movement mode of the object according to the detection result of the motion of the mirror moving picture in the area corresponding to the respective areas to be detected. Thus, in the information processing system using a player image acquired by a camera as the input interface, it is possible to improve the game entertainment.

9 Claims, 13 Drawing Sheets

FOREIGN PATENT DOCUMENTS

| | | |
|---|---|---|
| JP | 2001-273503 A | 10/2001 |
| JP | 2001-307124 A | 11/2001 |
| JP | 2002-149302 A | 5/2002 |
| JP | 2002-158717 A | 6/2002 |
| JP | 2002-196855 | 7/2002 |
| JP | 2002-292123 A | 10/2002 |
| WO | WO 99/34276 A2 | 7/1999 |

OTHER PUBLICATIONS

Jun Kubodera, "Action Interface niyoru Game Seisaku", The Institute of Electronics, Information and Communication Engineers Gijutsu Kenkyu Hokoku, vol. 97, No. 85, Jun. 3, 1997, pp. 99 to 104.

* cited by examiner

MOTION

DIFFERENCE RECOGNITION

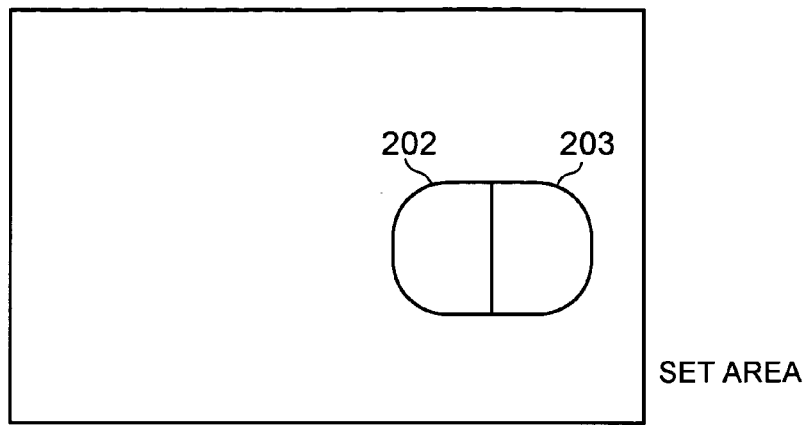
FIG. 5A  SET AREA
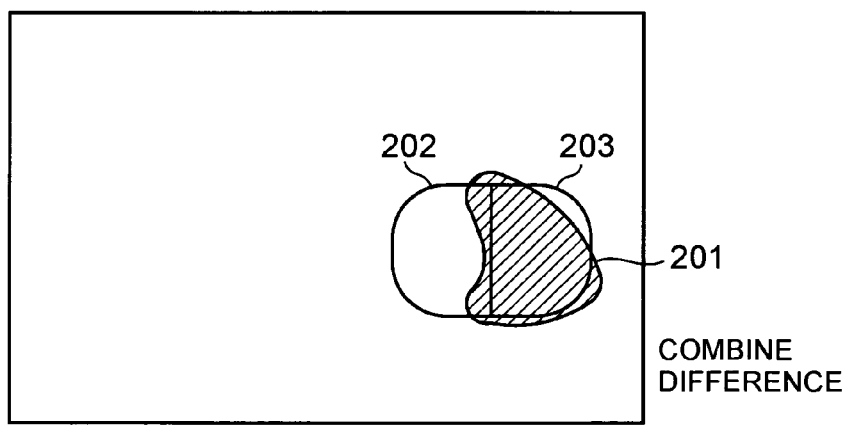
FIG. 5B  COMBINE DIFFERENCE
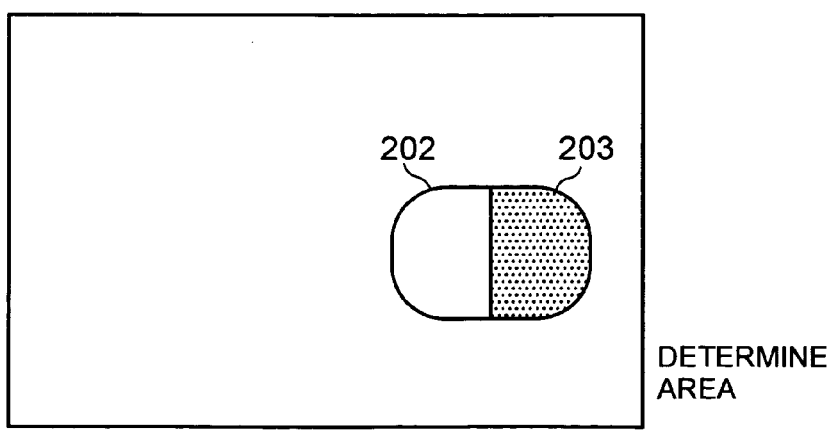
FIG. 5C  DETERMINE AREA

INFORMATION PROCESSING DEVICE FOR CONTROLLING OBJECT BY USING PLAYER IMAGE AND OBJECT CONTROL METHOD IN THE INFORMATION PROCESSING DEVICE This application is a National Phase Application of International Application No. PCT/JP2005/011777, filed Jun. 28, 2005, which claims the benefit under 35 U.S.C. 119 (a-e) of JP 2004-194815 filed Jun. 30, 2004, which is herein incorporated by reference.

TECHNICAL FIELD

The present invention relates to an information processing system that allows a game scenario to proceed by using a player image that is taken by a camera.

BACKGROUND ART

An information processing system has been proposed that uses a player image taken by a camera as an input interface to enter a command and the like.

For example, Patent Document 1 discloses an image processor that generates a combined moving image obtained by combining a mirrored moving image of the player and a computer image such as a menu image, and a hand of the player displayed on the image is assumed as a pointing device to accept a directive such as menu selection.

Patent Document 1: Japanese Patent Laid-Open Publication No. 2002-196855

SUMMARY OF THE INVENTION

Problems to be Solved by the Invention

Motion of the player and an operation for the image processor are directly related in the input interface disclosed by the Patent Document 1, thereby showing a universally accepted operability. Therefore, this technique is, in particular, expected to be applied in entertainment system fields, targeting a wide range of users at all ages. On the other hand, in applying such a technique in the entertainment system, design ideas to further improve the game quality are required.

An object of the present invention is to provide a technique to further improve game quality in information processing systems that use a player image taken by a camera, as an input interface.

Means for Solving the Problems

An information processing device according to a first aspect of the present invention to address the above subject, includes a detection means that detects an area where there is motion, from a mirrored moving image of a player, a control means that generates a computer image containing an object targeted for moving, and a display control means that allows a display device to display a superimposed moving image obtained by superimposing the mirrored moving image and the computer image, wherein, the control means sets multiple detection target areas concerning the object targeted for moving, and controls a movement mode of the object, in response to a detection result of the motion of the mirrored moving image in an area corresponding to each of the detection target areas.

According to the present invention, multiple detection target areas are provided for one object, and the object is moved in response to a detection result in each of the detection target areas for motion of the player displayed in a superimposed manner, thereby further improving the game quality in the information processing system using, as an input interface, an image of the player taken by a camera.

Here, the information processing device further includes a player moving image accepting means that accepts an input of the player moving image obtained by taking images of the player by an image pickup device, and a mirrored moving image processing means that generates a mirrored moving image by subjecting the player moving image to mirroring.

It is desirable that the display control means subjects the mirrored moving image to a translucent process, and superimposes this mirrored moving image and the computer image.

Specifically, the control means is capable of deciding a traveling direction of the object, based on a detection result as to the motion of the mirrored moving image in an area corresponding to each of the detection target areas.

At this time, the control means sets two detection target areas for the object, and decides a traveling direction of the object in such a manner that when motion is detected in one of the detection target areas, the object is made to proceed toward the other detection target area side, and when motion is detected in both of the detection target areas, the object is made to go straight ahead.

The detection means is capable of detecting an area in which where there is motion, based on a difference of the mirrored moving image between frames.

A recording medium according to a second aspect of the present invention for solving the above problems, includes a detection means that detects an area where there is motion, from a mirrored moving image of a player, a control means that generates a computer image containing an object targeted for moving, and a display control means that allows a display device to display a superimposed moving image obtained by superimposing the mirrored moving image and the computer image, wherein, the control means sets multiple detection target areas concerning the object targeted for moving, and controls a movement mode of the object, in response to a detection result of the motion of the mirrored moving image in an area corresponding to each of the detection target areas.

An object control method in an information processing device according to a third aspect of the present invention for addressing the above problems includes a detection process that detects an area where there is motion, from a mirrored moving image of a player, a control process that generates a computer image containing an object targeted for moving, and a display control process that allows a display device to display a superimposed moving image obtained by superimposing the mirrored moving image and the computer image, wherein, the control process sets multiple detection target areas concerning the object targeted for moving, and controls a movement of the object, in response to a detection result of the motion of the mirrored moving image in an area corresponding to each of the detection target areas.

BRIEF DESCRIPTION OF DRAWINGS

FIG. 5A illustrates detection target areas;

FIG. 5B is an illustration superimposing the detection target area and a player's motion detected area;

FIG. 5C illustrates an area where the player's motion is detected;

DESCRIPTION OF REFERENCE NUMERALS

1 VIDEO CAMERA
2 ENTERTAINMENT APPARATUS
3 DISPLAY DEVICE
101 VIDEO IMAGE INPUT SECTION
102 DIFFERENCE DETECTING SECTION
103 MAIN CONTROLLER
104 OBJECT DATA STORAGE
105 SUPERIMPOSED IMAGE GENERATOR
106 DISPLAY CONTROLLER

PREFERRED EMBODIMENTS OF THE INVENTION

Hereinafter, an exemplary embodiment of the present invention will be explained.

Figure 1:
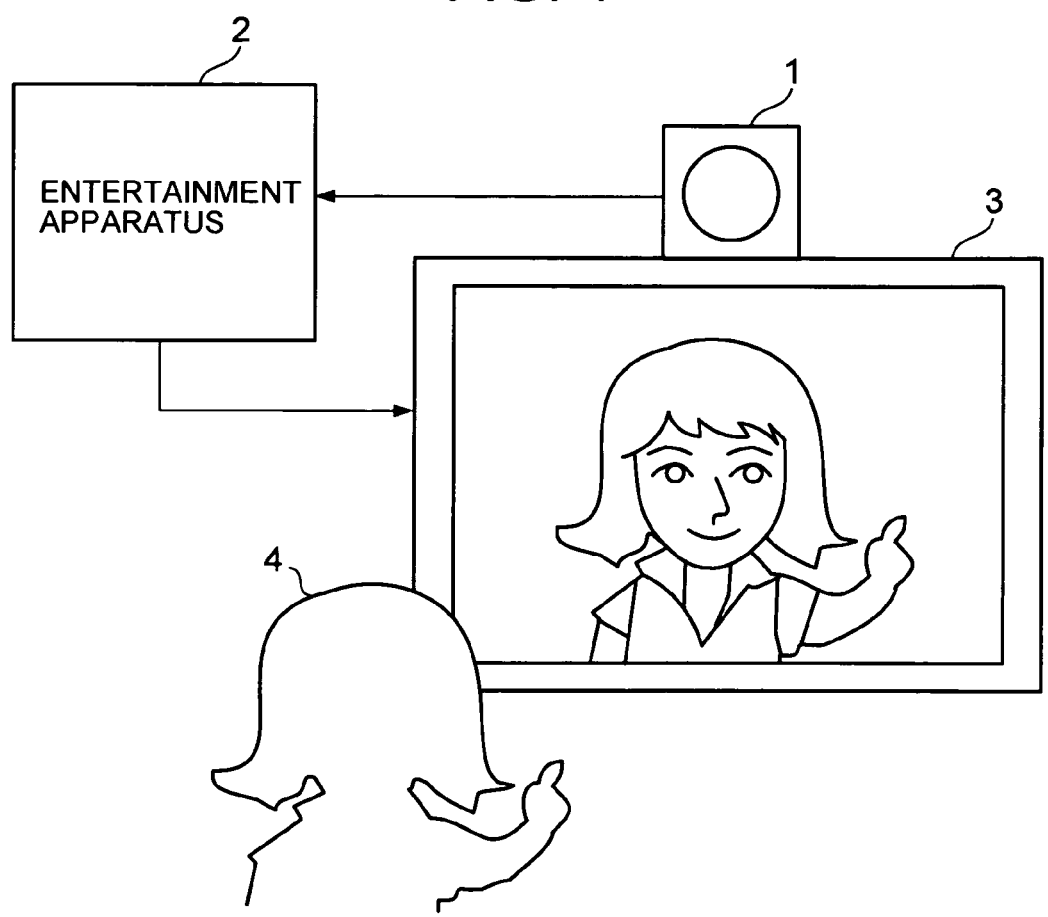
FIG. 1 is an overall illustration of an entertainment system relating to one embodiment of the present invention.

FIG. 1 shows an example of a configuration of an entertainment system relating to the present embodiment. This entertainment system takes an image of a player 4 who is at a position facing a display device 3, by using an analogue or digital video camera 1. An entertainment apparatus 2 continuously captures a moving image obtained, and the computer image (CG) generated by the entertainment apparatus 2 and a mirrored moving image of the moving image captured from the video camera 1 are superimposed, to be displayed in real time on the display device 3. Therefore, a movement of the player 4 is reflected in the superimposed image in real time, and the player can enjoy playing with this superimposed image. The entertainment apparatus 2 can generate the mirrored moving image by mirroring the moving image captured from the video camera 1 (right-left inversion of image) but another method may also be used. For example, the mirroring may be performed on the video camera 1.

Figure 2:
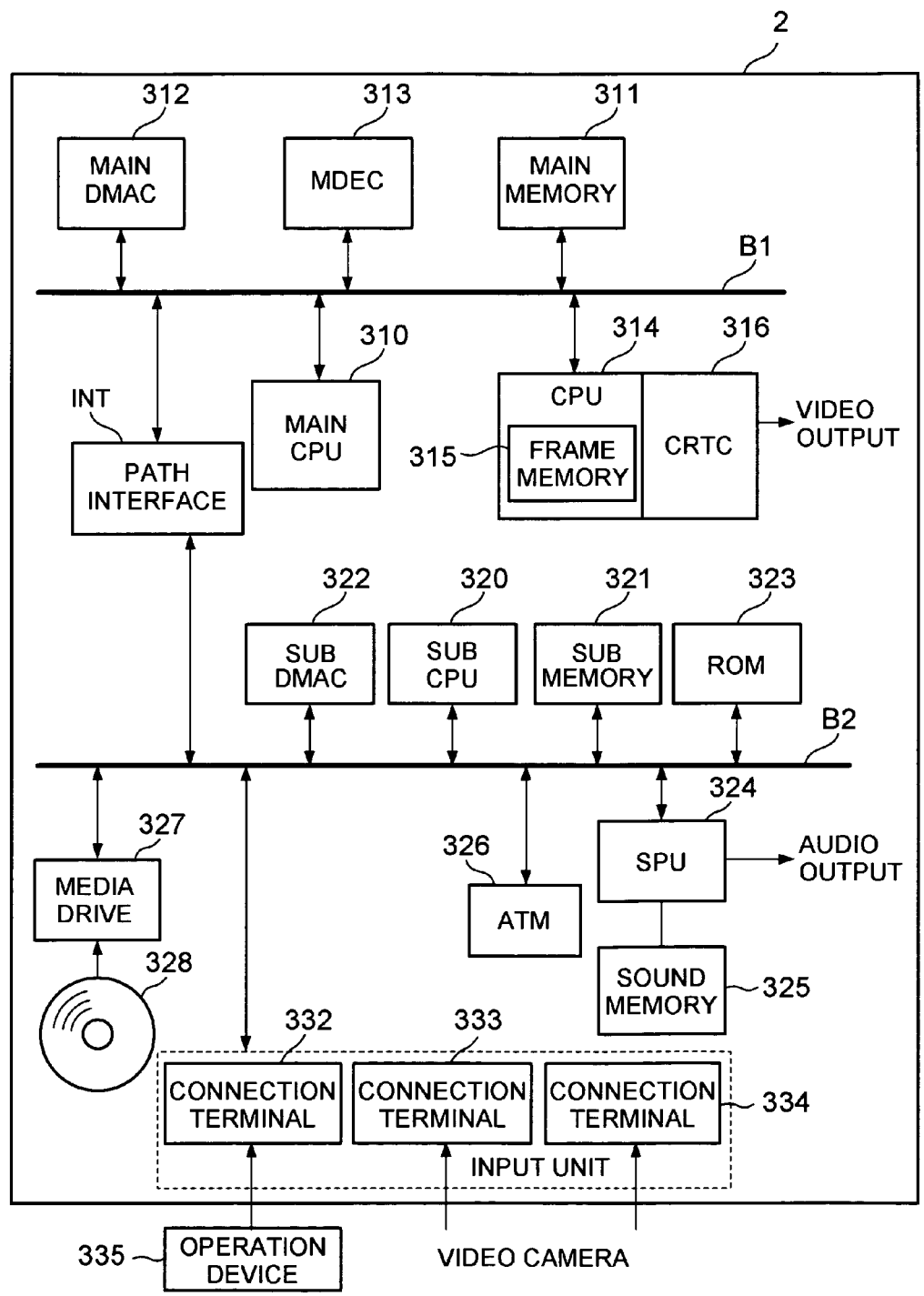
FIG. 2 is a block diagram showing a hardware configuration of an entertainment apparatus.

The entertainment apparatus 2 is implemented by an information processing device that performs required functions using a computer program. For example, as illustrated in the hardware configuration shown in FIG. 2, the entertainment apparatus 2 according to the present embodiment includes two buses, main bus B1 and sub bus B2, to which multiple semiconductor devices each having a specific function are connected. Those buses B1 and B2 are connected to each other or disconnected from each other via a bus interface INT.

The main bus B1 is connected to main CPU 310 that is a primary semiconductor device, main memory 311 made up of RAM, a main DMAC (Direct Memory Access Controller) 312, a MPEG (Moving Picture Experts Group) decoder (MDEC) 313, and a Graphic Processing Unit (hereinafter, referred to as "GPU") 314 that incorporates frame memory 315 serving as a drawing memory. The GPU 314 is connected to a CRTC (CRT Controller) 316 that generates a video signal that allows data drawn in the frame memory 315 to be displayed on the display device 3.

The main CPU 310 reads a startup program via the bus interface INT from the ROM 323 on the sub bus B2 at the time of starting the computer, and executes the startup program to activate the operating system. In addition, the main CPU 310 controls the media drive 327 to read an application program and data from the media 328 mounted on this media drive 327, and stores the application program and data being read, in the main memory 311. Furthermore, the main CPU 310 applies geometric processing (coordinate value calculation processing) to represent shape, movement, and the like, of an object, in various data read from the media 328, such as, for example, three-dimensional object data (coordinate values of vertices (representative points) of a polygon, etc.), made up of multiple basic graphics (polygons). Then, a display list is generated, which contains polygon definition information by the geometric processing. The polygon definition information includes as content, a shape and a drawing position of the polygon used, and specifications of components constituting the polygon, such as type, color tone, and texture.

The GPU 314 is a semiconductor device having the functions of storing drawing context (drawing data including polygon components), carrying out rendering processing (drawing processing) by reading necessary drawing context according to the display list notified from the main CPU 310, and drawing polygons in the frame memory 315. The frame memory 315 may also be used as a texture memory. Therefore, a pixel image in the frame memory 315 can be pasted as texture to a polygon to be drawn.

The main DMAC 312 is a semiconductor device that carries out DMA transfer control over each of the circuits connected to the main bus B1, and also carries out DMA transfer control over each of the circuits connected to the sub bus B2 according to the condition of the bus interface INT. The MDEC 313 is a semiconductor device that operates in parallel with the main CPU 310, and it has a function to extend data that has been compressed according to MPEG (Moving Picture Experts Group) format, JPEG (Joint Photographic Experts Group) format, or the like.

The sub bus B2 is connected to sub CPU 320 made of a microprocessor and the like, a sub memory 321 made of RAM, a sub DMAC 322, a ROM 323 that stores a control program such as an operating system, a sound processing-use semiconductor device (SPU: Sound Processing Unit) 324 that reads sound data accumulated in the sound memory 325 and outputs the data as an audio output, a communication controller (ATM) 326 that sends information to and receives information from an external device via a network, not illustrated, a media drive 327 to mount media 328 such as a CD-ROM and a DVD-ROM, and an input unit 331.

The sub CPU 320 carries out various operations according to the control program stored in the ROM 323. The sub DMAC 322 is a semiconductor device that carries out control such as DMA transfer over each of the circuits connected to the sub bus B2, only in the state in which the bus interface INT disconnects the main bus B1 from the sub bus B2. The input unit 331 is provided with a connection terminal 332 through which an input signal from the operation device 335 is inputted, a connection terminal 333 through which an image signal from the video camera 1 is inputted, and a connection terminal 334 through which a sound signal is inputted from a video camera 1 or the like. It is to be noted that in the present embodiment, an explanation will be given regarding images only, and explanations regarding sound will be omitted for convenience.

The computer thus configured operates as the entertainment apparatus 2, when the main CPU 310, the sub CPU 320, and the GPU 314 read necessary computer programs from a recording medium such as the ROM 323 and the media 328, and executes the computer programs.

Figure 3:
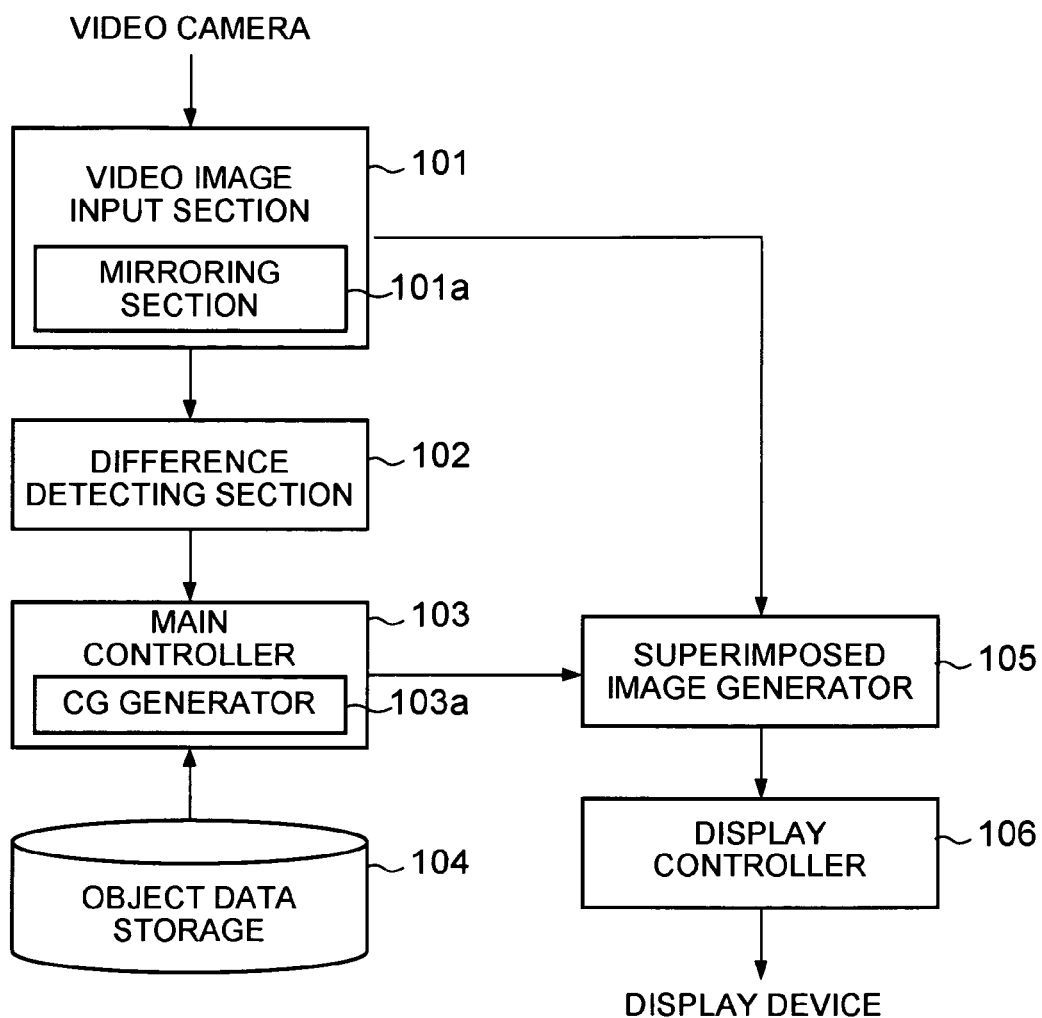
FIG. 3 is a block diagram showing a functional configuration of the entertainment apparatus.

FIG. 3 is a functional block diagram of this entertainment apparatus 2. In other words, a video image input section 101, a difference detecting section 102, a main controller 103, object data storage 104, a superimposed image generator 105, and a display controller 106 are formed in the entertainment apparatus 2. The entertainment apparatus 2 configures the functional block as shown in FIG. 3, by executing programs stored in a storage medium such as a DVD-ROM and a CD-ROM.

The video image input section 101 captures a video image taken by the video camera 1, subjects the video image to mirroring, that is, a right-left inversion process, and outputs this processed image. The video image is a moving image, and the video image input section 101 continuously captures images transferred from the video camera 1. Therefore, the video image input section 101 is provided with a mirroring section 101a. Subsequent processing is performed for the video image that has been subjected to the mirroring. If the mirroring of the video image is set to be performed on the video camera 1, it is possible to eliminate the mirroring section 101a.

The difference detecting section 102 compares frames of the mirrored video image, one by one, and detects a difference between a before-frame and an after-frame. As a result of the detection, an area showing a different value corresponds to an area where there is a change between before and after frames. In other words, by detecting the difference, it is possible to obtain an area where a change has occurred in the video image, specifically, an area where the player was in motion.

In order to derive the difference value, the difference detecting section 102 stores, in the main memory 311, a mirrored moving image as a "reference image" to be used for comparison with another frame of the mirrored moving image. The mirrored moving image to be stored may represent one frame of the mirrored moving image entirely, but it may also be possible to store a partial area to be noted, since it is sufficient that a difference value in the area as a detection target can be derived.

It is desirable to assume that the difference value above is detected, when some difference values are accumulated for a predetermined period of time and the accumulated value goes over a certain threshold. With such a configuration, it is possible to eliminate an unintended minor motion of the player from the detection target, and an area showing a definitive motion of the player can be figured out.

Figure 4A:
FIG. 4A is an illustration showing a motion of a player.

As shown in FIG. 4A, in a case taken as an example, the player in the video image exhibits a motion of waving a hand continuously. The difference detecting section 102 recognizes a player's motion detection area 201, since a difference value is generated in the area corresponding to the movement of the hand. The main controller 103 is notified of the recognition result, and this result is used for determining how an object appearing in the game scenario moves. It is to be noted that the motion of the player may be detected by extracting a difference between frames as to a characteristic part by carrying out pattern recognition. In this case, direction, speed, and the like, of the player's motion may also be recognized.

The main controller 103 conducts overall control of the entertainment system. For example, when the entertainment apparatus 2 is executing a game program, the main controller 103 decides how the game proceeds and the like, according to the program. In addition, when the main controller 103 decides how the game proceeds, in particular, when a movement of the object appearing in the game is decided, a detection result from the difference detecting section 102 may be referred to.

An explanation will be given for the case in which the main controller refers to the detection result from the difference detecting section 102. Firstly, the main controller 103 is capable of setting one or multiple detection target areas within a video image. This detection target area can be utilized to determine whether or not there is a motion of the player in that area. That is, it is sufficient for the difference detecting section 102 to obtain a difference value within a detection target area, so as to detect a motion of the player.

Figure 4B:
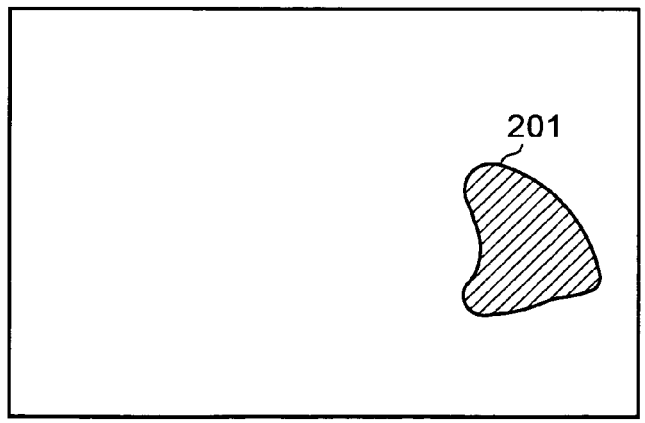
FIG. 4B is an illustration showing a detected area.

For instance, FIG. 5A shows an example of the detection target areas set by the main controller 103. In this figure, a detection target area 202 and a detection target area 203 are provided within the image. In the situation where the detection target areas are set as such, it is assumed here that the difference detecting section 102 has detected the area 201 as shown in FIG. 4B, based on the player's motion as shown in FIG. 4A.

FIG. 5B is an illustration superimposing the detection target areas 202 and 203, and the area 201 where the player's motion has been detected. In the example as shown in this figure, the player's motion has been detected in the detection target area on the right side, that is, in the detection target area 203. Consequently, as shown in FIG. 5C, the main controller 103 recognizes that the player's motion is detected in the detection target area 203, but it is not detected in the detection target area 202. When a motion of the player is detected outside the detection target areas, there is no effect on the main controller 103.

Here, there may be an occasion in which detection target areas are adjacent to each other, or a motion of the player is detected even in the detection target area that is not intended by the player. In order to avoid such a situation, a threshold is provided in detecting the player's motion in a detection target area. When an evaluated value associated with a difference value between frames exceeds the threshold in a detection target area, it is desirable to accept that the detection target area is an area where the player's motion has been detected.

Even in the case where the threshold is provided as such, a motion of the player may be detected in multiple detection target areas. In such an occasion, a detection target area can be treated as an area where the player's motion has been detected, if that detection target area has the largest evaluated value associated with the difference value, that is, it has the largest area where the motion has been detected. Alternatively, it is possible to assume that a motion of the player is detected in each of the detection target areas. The main controller 103 is capable of deciding which detection method is to be employed, according to a game scenario or the like.

The detection target area may be shifted, or the like, according to the progress of the game scenario. For instance, the area may be changed in position, in shape, and the like, following the movement of the object targeted for moving in the game.

The main controller 103 further generates a computer image to be presented to the player, according to the game scenario. Therefore, the main controller 103 is provided with a CG generator 103a. The CG generator 103a generates various computer images according to the game story. In this occasion, the main controller 103 refers to object data recorded in the object data storage 104.

The superimposed image generator 105 generates a superimposed image obtained by superimposing the video image that has been subjected to mirroring in the image inverting section 102, and the computer image generated by the CG generator 103a. In this occasion, the video image may be superimposed after being subjected to the translucent process so that the player can easily recognize the computer image.

The display controller 106 allows the display device 3 to display the superimposed image generated by the superimposed image generator 105. In other words, the player is allowed to conduct various operations in the entertainment system, while the player is viewing the superimposed image obtained by superimposing the mirrored moving image of himself or herself and the computer image.

Figure 6A:
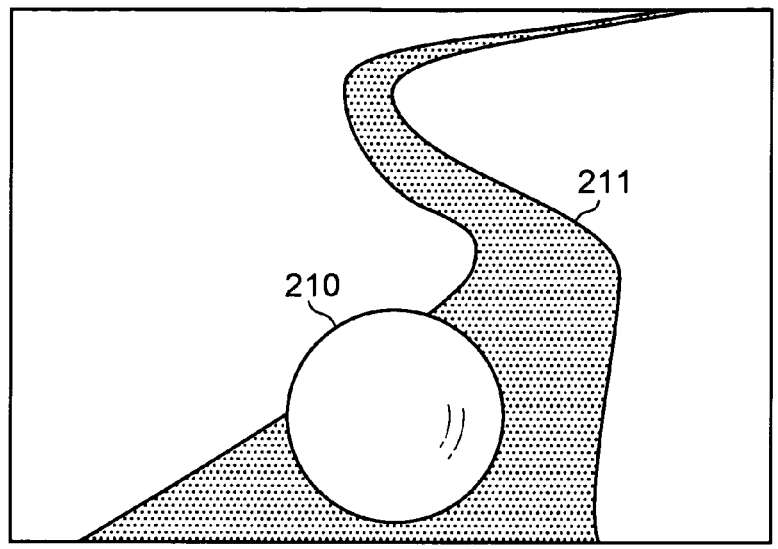
FIG. 6A illustrates an object targeted for moving according to the first embodiment.

Next, a first embodiment of an object movement process, mainly performed by the main controller 103, will be explained. In the present embodiment, as shown in FIG. 6A, a ball 210 that is an object targeted for moving is displayed in a computer image. Here, it is assumed that the ball 210 is made to move along the course 211 according to motion of the player. In this image being displayed, it is possible to make the ball 210 appear as if rolling on the course 211, by changing the course 211 and background thereof, with respect to the ball 210. In addition, the computer image may include playing time (time limit), score, and other information to be presented to the player according to the game scenario.

Figure 6B:
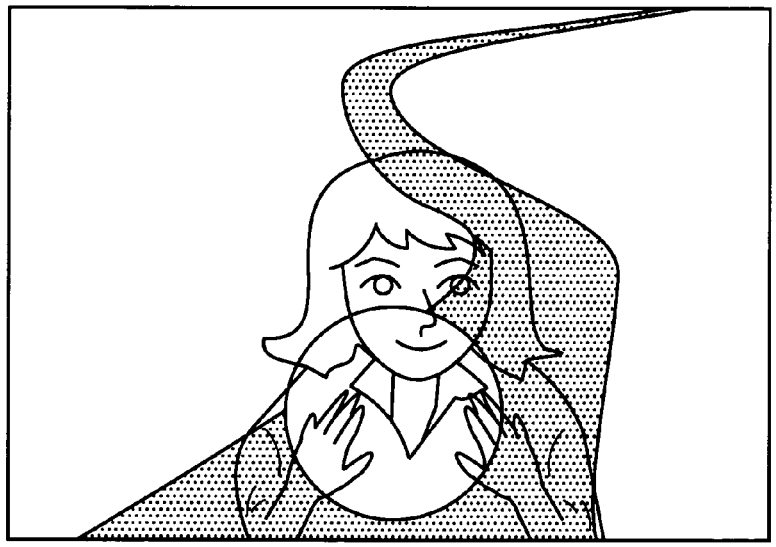
FIG. 6B illustrates a playing screen according to the first embodiment.

FIG. 6B illustrates a screen at during play, showing that a mirrored moving image of the player is superimposed on the computer image as shown in FIG. 6A. In this case, the mirrored moving image is rendered translucent to be displayed on the computer image in a superimposed manner, so that the player can easily recognize the ball 210 targeted for moving and the course 211. It is assumed that the course 211 is provided with a start point and a goal or finish point, and a path curving from side to side is set from the start point to the goal point. Furthermore, the course 211 may be provided with an upward slope and a downward slope. The object data storage 104 stores, in advance, image data of the ball 210 and image data and geographic data and the like of the course 211. It is desirable to generate a computer image in which the ball 210 appears to be rolling along with the movement of the ball 210.

Figure 7A:
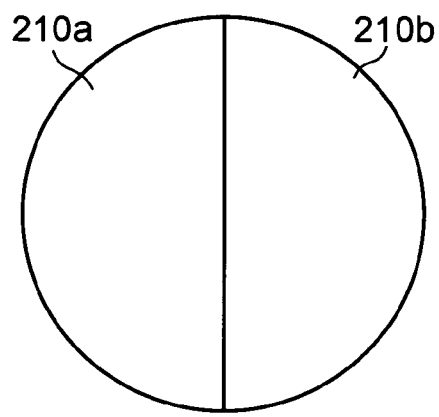
FIG. 7A illustrates a detection target area according to the first embodiment.
Figures 7B, 7C, 7D:
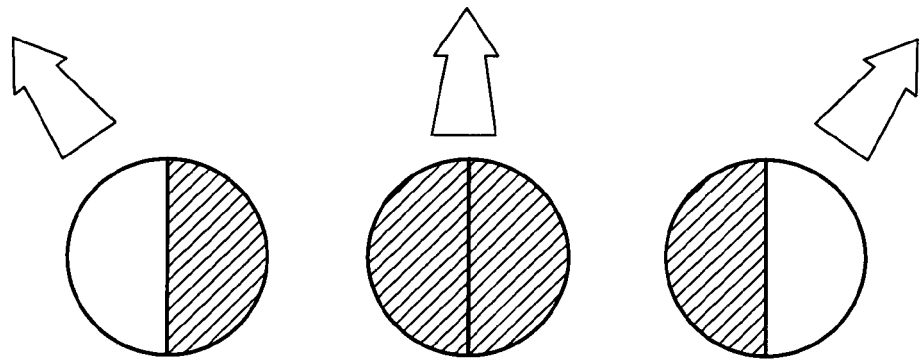
FIG. 7B illustrates a movement of a ball.
FIG. 7C illustrates a movement of the ball.
FIG. 7D illustrates a movement of the ball.

In the present embodiment, as shown in FIG. 7A, the main controller 103 sets a detection target area 210a and a detection target area 210b, so as to be associated with the area of the ball 210. When a player's motion is detected in the right detection target area 210b, a display is provided in which the ball 210 moves to the left and forward as shown in FIG. 7B. When a player's motion is detected in both of the detection target areas 210a and 210b, a display is provided in which the ball 210 moves ahead as shown in FIG. 7C. When a player's motion is detected in the left detection target area 210a, a display is provided in which the ball 210 moves right forward as shown in FIG. 7D. When a player's motion is not detected in any of the detection target areas, the ball 210 is kept unchanged if it were standing still. If the ball 210 is moving, a display is provided in which speed of motion appears to become slower.

In this situation, the course and other elements in the computer image may be changed so as provide a display in which the ball 210 looks like it is moving. When the upward and downward slopes, and the like, are provided in the course, it is possible to further improve the game entertainment features, by controlling the ball 210 to roll at an accelerated speed along the downward slope, and to roll at a decelerated speed along the upward slope.

It is further possible to generate a computer image in which a character, such as a human being, an animal, or the like, is riding on the ball 210, thereby providing a game in which the character appears to be balancing on the ball.

In the present embodiment, the player is allowed to control the movement of the ball 210, by motion in the vicinity of the ball 210, as in, for example, waving a hand. Specifically, when there is motion on the right side of the ball 210, the ball 210 moves in the left direction, and when there is motion on the left side of the ball 210, the ball 210 moves in the right direction. If there is motion on the full face of the ball 210, the ball 210 goes straight ahead. In this way, a game is provided which moves the ball 210 from the start point of the course up to the goal point thereof, according to the player's motion. In this case, it may also be possible to create a challenge such as setting a limit time and the player is required to reach the goal point within the limit time.

Figure 9:
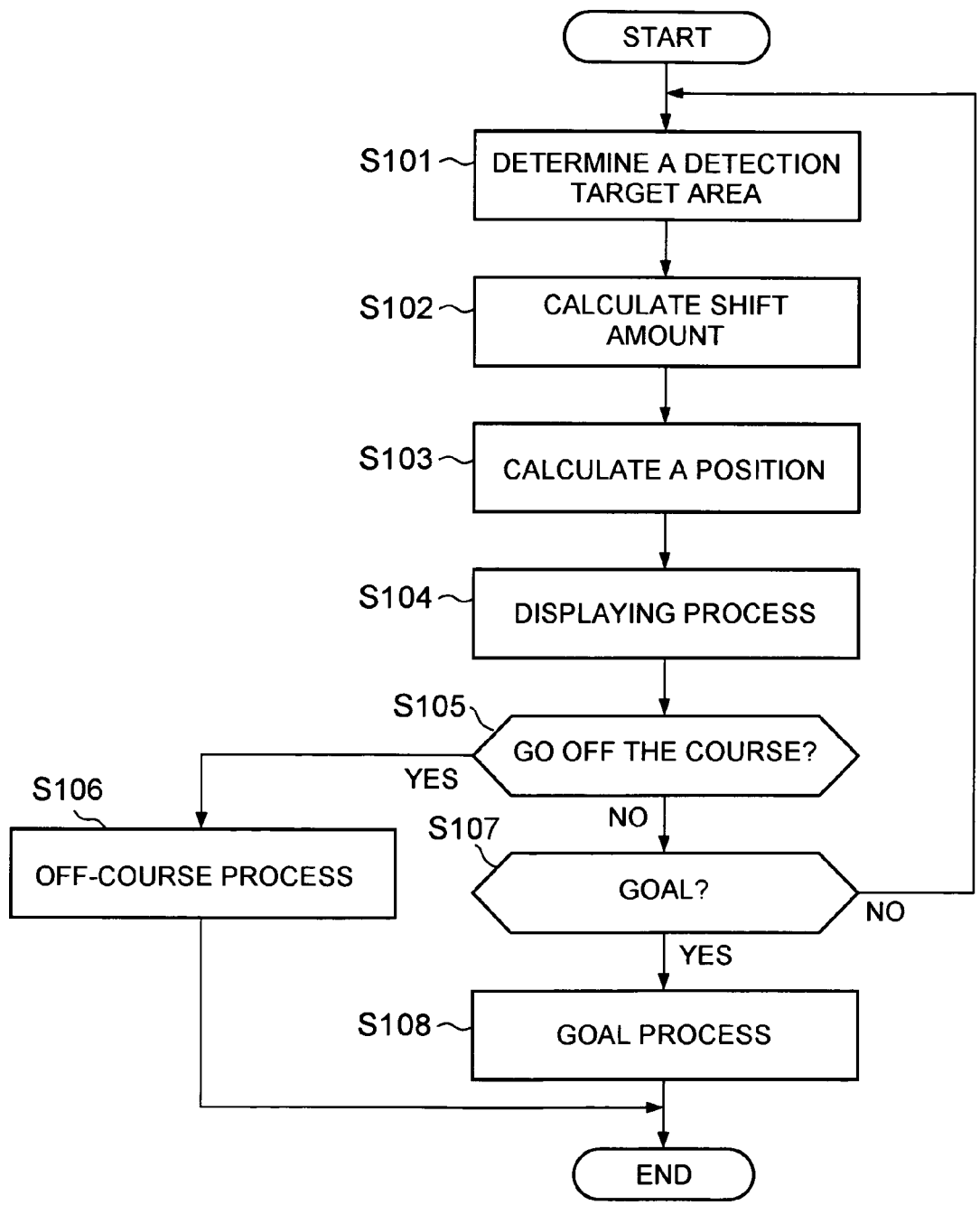
FIG. 9 is a flow diagram showing a control according to the first embodiment.

FIG. 9 is a flow diagram to explain processing in the entertainment system according to the first embodiment. Once play is started according to a directive from the player, the entertainment system repeats the processing, described below, at prescribed intervals, for example, every one frame, until the end of the game.

Firstly, the entertainment system determines whether or not a motion of the player has been detected in the detection target areas 210a and 210b (S101).

According to the detection result, a value of shift amount of the ball 210 is calculated in line with a predetermined rule (S102). The predetermined rule defines a moving direction of the ball 210 based on whether or not a motion is detected in either or both of the right and left detection target areas 210a and 210b, as described above. In addition, the shift amount may be set to a value previously determined. However, the shift amount may be varied according to how the ball 210 moves. For example, it is also possible to gradually accelerate the ball 210 if the detection of the player's motion is repeated, whereas the ball 210 may be decelerated if any motion of the player is not detected. Furthermore, conditions of the course (upward slope, downward slope, road type) may affect the movement of the ball 210.

Next, on the basis of the calculated shift amount of the ball 210, a position of the ball 210 on the course is calculated (S103). This position can be obtained based on the position at a previous point of time and the calculated shift amount of the ball 210.

Then, a displaying process is performed based on the position of the ball 210 on the course, and the computer screen is updated (S104). Specifically, scenery and the like of the course associated with the calculated position are generated as a computer image.

By repeating the processing above, it is seen that the ball 210 moves according to the player's motion.

In this way, in the present embodiment, multiple detection target areas (210a, 210b) are provided with respect to one object (the ball 210), and the object is moved according to the detection result from each of the detection target areas, thereby proceeding with the game scenario.

When the ball 210 goes off the course (S105: Y) as a result of calculating the position of the ball 210, off-course processing (S106) is performed and the game is over. The off-course processing may include, for example, displaying a computer image that the ball is tumbling down, and displaying that the game is over.

As a result of calculating the position of the ball 210, if it reaches the finish (S107: Y), finish processing is performed (S108), and the game is cleared. The finish processing (S108) may include, for example, adding a point for the player, and displaying that the game is cleared.

Figure 8A:
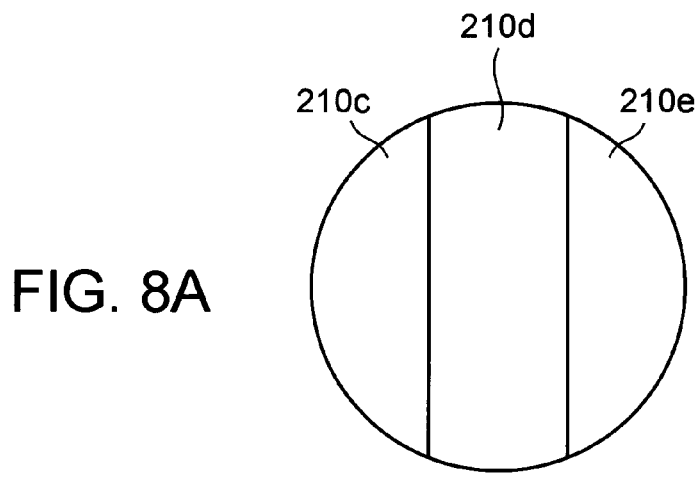
FIG. 8A illustrates another example of the detection target area according to the first embodiment.

In the above example, there are provided two detection target areas for the ball 210. However, as shown in FIG. 8A, it is further possible to provide three areas. In the example of this figure, a detection target area 210c is provided on the left side of the ball 210, a detection target area 210d is provided at the center, and a detection target area 210e is provided on the right side.

An explanation will be given for an example of a detection result in each detection target area and a movement of the ball 210, in the case where three detection target areas are provided.

In the present example, it is assumed that a motion of the player may be detected in multiple detection target areas, and an evaluated value being associated with a detected size-of-difference value is calculated. In other words, with respect to each detection target area in which the player's motion is detected, an evaluated value is obtained which is associated with a scale of the player's motion.

Here, it is assumed that the evaluated value obtained is further sorted into a "large value" and a "small value" according to predetermined criteria. Accordingly, with respect to each detection target area, a detection can be made as to whether the player's motion, is "large" or "small".

In the case above, it is possible to conduct various controls in response to the detection result. For example, when a player's motion is detected only in the central detection target area 210d, the ball 210 is made to go straight ahead.

Figure 8B:
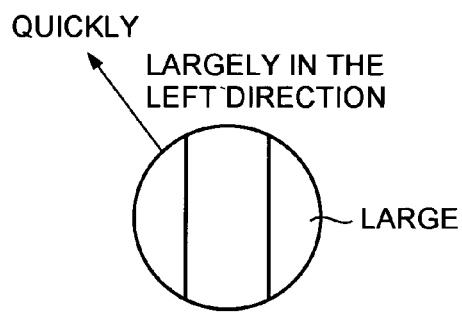
FIG. 8B illustrates a movement of the ball.
Figure 8C:
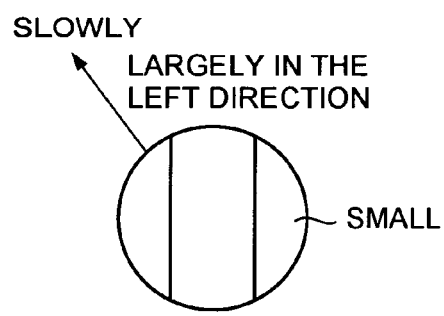
FIG. 8C illustrates a movement of the ball.

When a large scale motion of the player is detected only in the right detection target area 210e, the ball proceeds largely in the left direction at high speed, as shown in FIG. 8B. If the detected motion of the player is small, the ball proceeds largely in the left direction at low speed, as shown in FIG. 8C. In this way, the player is allowed to control the speed of the ball 210 by changing the scale of the player's motion.

Figures 8D, 8E:
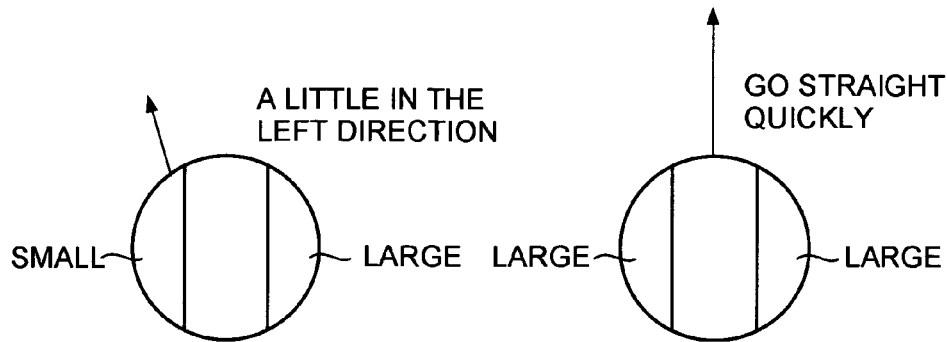
FIG. 8D illustrates a movement of the ball.
FIG. 8E illustrates a movement of the ball.

When a large scale motion of the player is detected in the right detection target area 210e, and a small scale motion of the player is detected in the left detection target area 210c, the ball proceeds a little in the left direction as shown in FIG. 8D. In this way, it is possible to sensitively control the direction in which the ball 210 is headed, by changing the scale of the motions on the both sides.

In the state as described above, if the player makes the motion larger, which is associated with the left detection target area 210c, large scale motions of the player are detected in both the right detection target area 210e and the left detection target area 210c. In this case, for example, the ball is made to go straight ahead at high speed, as shown in FIG. 8E.

As thus described, more sensitive control can be performed for the movement of the ball 220, by providing more detection target areas for the ball 220, or by calculating an evaluated value according to the scale of the player's motion.

Figure 10A:
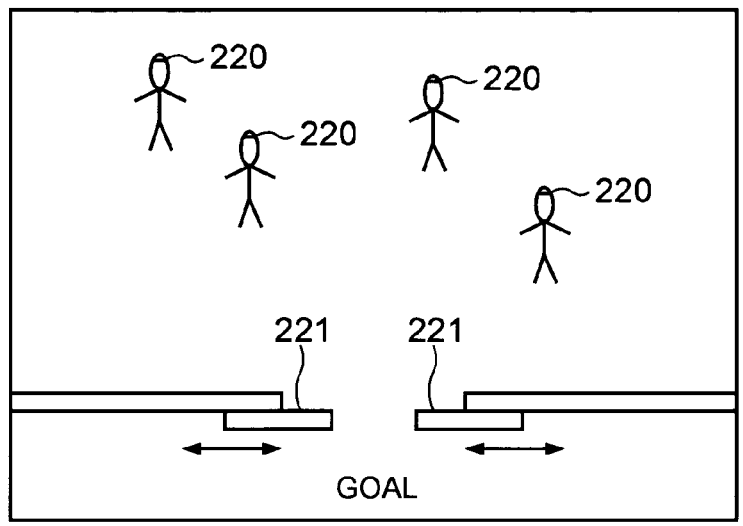
FIG. 10A illustrates objects targeted for moving according to the second embodiment.

Next, a second embodiment of the object moving process that is mainly performed by the main controller 103 will be explained. In the present embodiment, as shown in FIG. 10A, characters 220 are displayed in a computer image as an object targeted for moving. It is assumed that multiple characters 220 may exist. It is also assumed that those characters 220 are moved according to motion of the player. A goal is provided in the computer image, and the goal is further provided with an opening and closing door. This door is controlled to be opened and closed as appropriate. It is assumed that the player operates the characters 220 so that they reach the goal going through the door being opened. The computer image may further include a time limit, score, and other information to be presented to the player according to the game scenario.

Figure 10B:
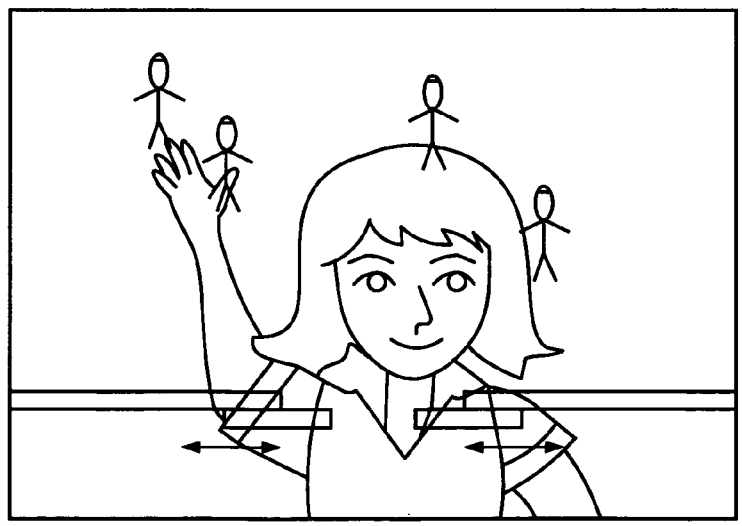
FIG. 10B illustrates a play screen according to the second embodiment.

FIG. 10B illustrates a screen at the time of playing, which is obtained by superimposing the mirrored moving image of the player on the computer image, as shown in FIG. 10A. In this occasion, in order to facilitate the player in recognizing the character 220 targeted for moving, the door 221, the goal, and the like, the mirrored moving image is rendered translucent and displayed as being superimposed on the computer image. The image data and the like of the character 220 are stored in advance in the object data storage 104.

Figure 11A:
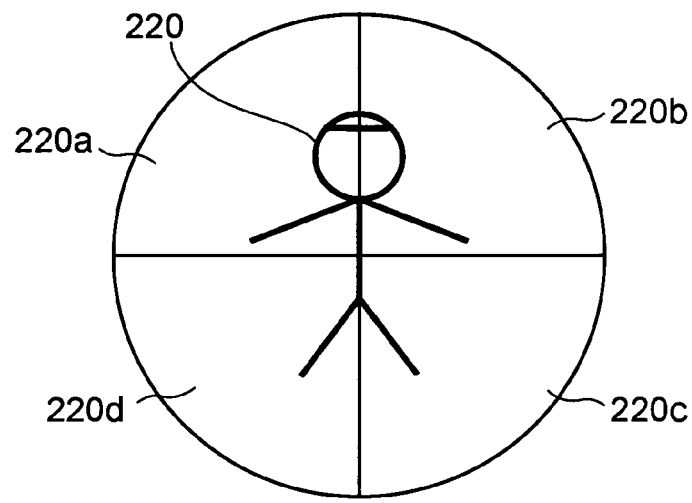
FIG. 11A illustrates another example of detection target according to the second embodiment.

In the present embodiment, as shown in FIG. 11A, the main controller 103 sets detection target areas 220a, 220b, 220c, and 220d, at four sections, associated with the area where a character 220 exists. In other words, the upper-left detection target area 220a, the upper-right detection target area 220b, the lower-right detection target area 220c, and the lower-left detection target area 220d are provided, while placing the character 220 at the center.

Figure 11B:
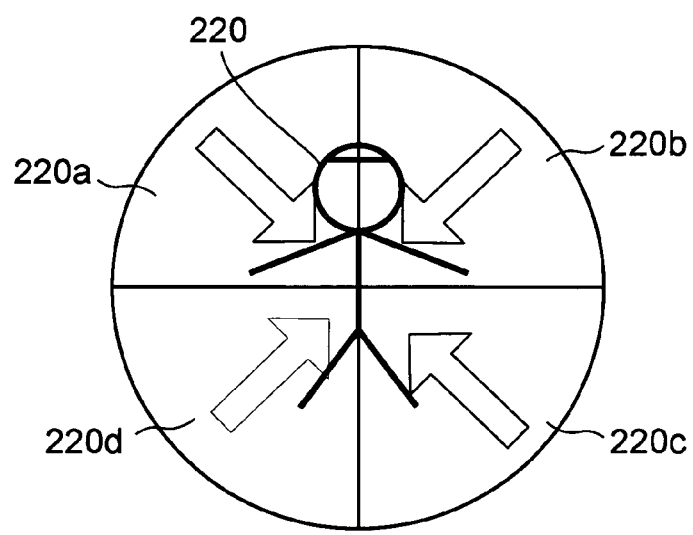
FIG. 11B illustrates a movement of a character.

Then, when a motion of the player is detected in any of the detection target areas, the character 220 is moved away from that detection target area. In other words, when a motion of the player is detected in the upper-left detection target area 220a, the character 220 is displayed moving toward the lower right, as shown in FIG. 11B. Similarly, when a motion of the player is detected in the upper-right detection target area 220b, the character 220 is displayed moving toward the lower left. When a motion of the player is detected in the lower-right detection target area 220c, the character 220 is displayed moving toward the upper left, and when a motion of the player is detected in the lower-left detection target area 220d, the character 220 is displayed toward the upper right. Therefore, in the present embodiment, if motion of the player is detected in multiple detection target areas, it is assumed that an area having the largest evaluated value associated with the difference value, that is, the detection target area having the largest area where the motion has been detected, is treated as the detection target area where the motion of the player has been detected.

In the present embodiment, the player is allowed to control the movement of the character 220 by motion in the vicinity of the character 220, for example, by waving a hand. Since more than one character 220 may exist, the player firstly specifies the character 220 to be moved, and then carries out the operation for moving the character.

The character 220 to be moved may be specified according to the following procedure, for example. That is, in a state in which any of the characters 220 have not become a target for moving yet, if a motion of the player is detected in any of the detection target areas of a certain character 220, this character 220 is treated as a moving target. In order to clarify that the character 220 has become the moving target, it is desirable to distinguish the character 220 from other characters 220, by changing the color, attaching a mark, or the like.

Figure 13:
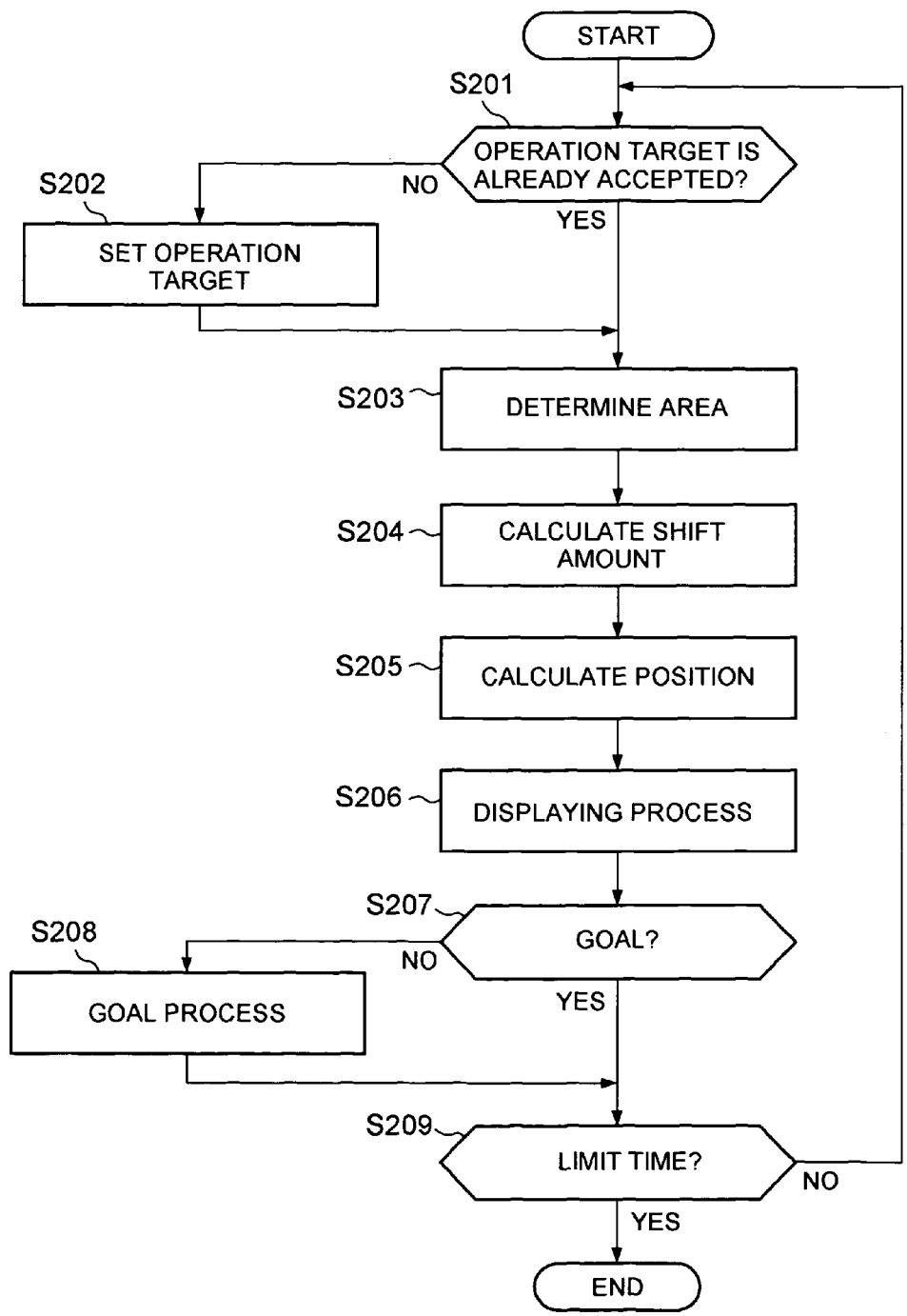
FIG. 13 is a flow diagram showing a control according to the second embodiment.

FIG. 13 is a flow diagram to explain a processing of the entertainment system according to the second embodiment. In the entertainment system, once playing is started according to a directive from the player, processing, as described below, is repeated at prescribed intervals, for example, every one frame, until the end of the game.

Firstly, the entertainment system determines whether or not any of the characters 220 can be set as a target for operation (S201).

As a result of the determination, if any of the characters 220 is not treated as a target for operation (S201: N), a character 220 as an operation target is set according to a directive from the player (S202). In other words, a character 220 for which a motion of the player is detected, in any of the detection target areas, is set as an target for operation. It is to be noted that multiple characters 220 may be set as operation targets.

When the character 220 as an operation target is set (S201: Y, S202), a determination is made as to which detection target area the motion of the player is detected, for the character 220 targeted for operation (S203).

In response to the detected result, a shift amount of the character 220 is calculated in line with a predetermined rule (S204), and a position that is a destination of the character 220 is also calculated (S205). The predetermined rule defines a traveling direction of the character 220 in response to a detection result in any of the detection target areas 220a to 220d, located at upper left, upper right, lower right, and lower left, as described above. It is further possible to set the shift amount as a predetermined value.

It is to be noted that a position of a moving destination may be decided based on the detection result and the character 220 is moved so that the character 220 approaches the position gradually. In this case, it is not necessary to make a decision about the detection target area, frame by frame for this character 220, until the character 220 reaches the destination.

Processing to display that the character 220 is in the course of moving is performed, and the computer screen is updated (S206).

The processing above is repeated until a limited time period has elapsed (S209: Y), thereby representing the fact that the character 220 has moved according to the motion of the player.

In this way, also in the present embodiment, multiple detection target areas (220a, 220b, 220c, 220d) are provided for one object (character 220). The object is moved based on a detection result in each of the detection target areas, whereby the game scenario progresses.

As a result of calculating the position of the character 220, if the character reaches the goal (S207: Y), the character 220 is subjected to goal processing (S208). In the goal processing, for example, a point is added to the player. Furthermore, the character 220 is excluded from the operation target.

Figure 12A:
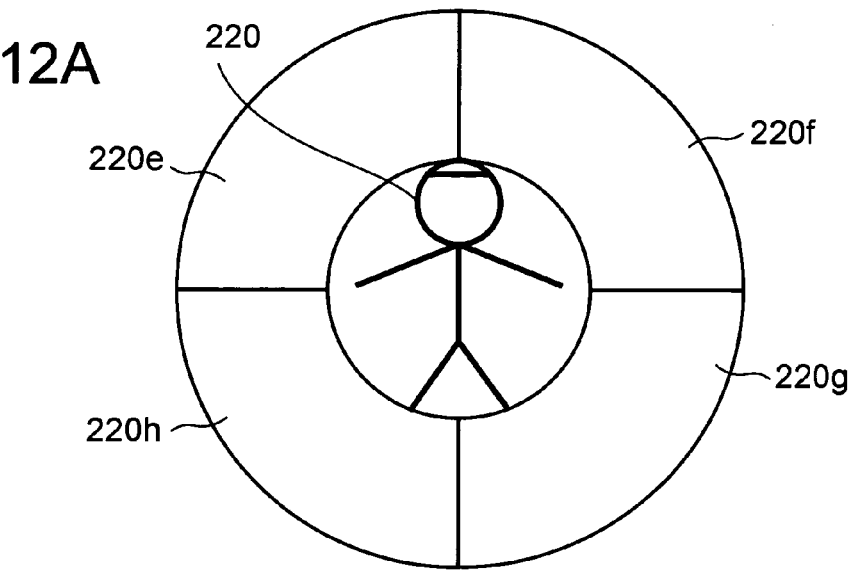
FIG. 12A illustrates another example of a detection target area according to the second embodiment.
Figure 12B:
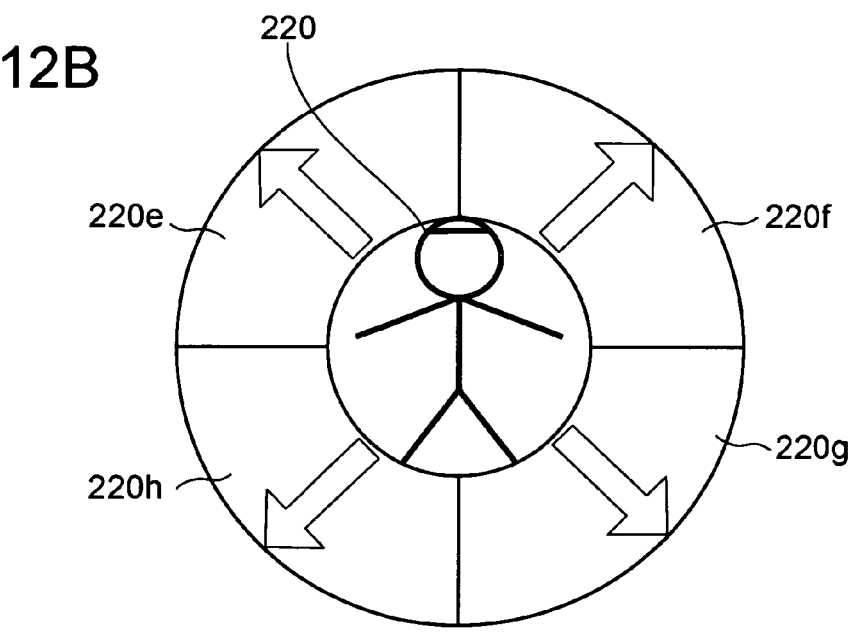
FIG. 12B illustrates a movement of the character.

In the example above, four detection target areas are provided within a circular area having the character 220 at the center. However, as shown in FIG. 12A, it is possible to provide the detection target areas within a doughnut-shaped area, excluding a portion in which the character 220 is located. Here, it is assumed that detection target area 220e is provided on the upper left, detection target area 220f is provided on the upper right, detection target area 220g is provided on the lower right, and detection target area 220g is provided on the lower left.

If a player's motion is detected in any of the detection target areas, the character 220 is moved so as to proceed toward that detection target area. In other words, if a player's motion is detected in the upper left detection target area 220a, the character 220 is displayed moving toward the upper left. Similarly, if a player's motion is detected in the upper right detection target area 220b, the character 220 is displayed moving toward the upper right. If a player's motion is detected in the lower right detection target area 220c, the character 220 is displayed moving toward the lower right, and if a player's motion is detected in the lower left detection target area 220d, the character 220 is displayed moving toward the lower left.

When the detection target areas are provided as shown in this figure and a moving direction of the character 220 is determined, for example, when the player is in motion in the right lower detection target area 220g, the character 220 moves toward the lower right direction. If the player further continues the motion at the same position, the character 220 then comes up to the position where the player is in motion. Accordingly, the position of the character 220 and the position where the player is in motion are superimposed, putting the motion of the player outside the detection target area. Consequently, the motion of the player is not detected any more, and the movement of the character 220 stops. In other words, the player is in motion at a place that is a moving destination, thereby controlling the position to which the character 220 is to move.

It is to be noted that in the first embodiment and the second embodiment, if what is referred to as pattern recognition is employed for detecting motion of the player, by detecting a difference in a characteristic portion, it is possible to move the ball 210 and the character 220 that are targets for operation, taking into account direction, speed, and the like, of the player's motion that has been recognized.

As thus described, according to the present invention, multiple detection target areas are provided for one object displayed in a computer image, and the object is moved in response to the detection result in each of the detection target areas associated with the player's motion, which are displayed in a superimposed manner, thereby allowing the game scenario to progress. Accordingly, it is possible to improve the game quality in the information processing system, which uses as an input interface an image of the player taken by a camera.

What is claimed is:

1. An information processing device comprising:
    a detection means that detects an area where there is motion, from a mirrored moving image of a player based on a difference of the mirrored moving image between frames;
    a control means that generates a computer image containing an object targeted for moving; and
    a display control means that allows a display device to display a superimposed moving image obtained by superimposing the mirrored moving image and the computer image; wherein, the control means sets multiple detection target areas concerning the object targeted for moving, and controls a movement mode of the object, in response to a detection result of the motion of the mirrored moving image in an area corresponding to each of the detection target areas, wherein,
    with regard to two detection target areas among the multiple detection target areas, the control means decides a traveling direction in such a manner that when motion is detected in one of the detection target areas, the object is made to proceed toward the other detection target area side, and when motion is detected in both of the detection target areas, the object is made to go straight ahead.

2. The information processing device according to claim 1, further comprising:

a player moving image accepting means that accepts an input of a player moving image obtained by taking images of the player by an image pickup device; and a mirrored moving image processing means that generates the mirrored moving image by subjecting the player moving image to mirroring.

3. The information processing device according to claim 1, wherein, the display control means subjects the mirrored moving image to a translucent process, and superimposes the mirrored moving image and the computer image.

4. The information processing device according to claim 1, wherein, the control means includes a display in the computer image, serving as guidance for the player regarding the traveling direction of the object.

5. A recording medium on which is recorded a program causing an information processing device to perform functions, comprising:

a detection means that detects an area where there is motion, from a mirrored moving image of a player based on a difference of the mirrored moving image between frames;

a control means that generates a computer image including an object targeted for moving; and a display control means that allows a display device to display a superimposed moving image obtained by superimposing the mirrored moving image and the computer image; wherein, the control means sets multiple detection target areas concerning the object targeted for moving, and controls a movement mode of the object, in response to a detection result of the motion of the mirrored moving image in an area corresponding to each of the detection target areas, wherein, with regard to two detection target areas among the multiple detection target areas, the control means decides a traveling direction in such a manner that when motion is detected in one of the detection target areas, the object is made to proceed toward the other detection target area side, and when motion is detected in both of the detection target areas, the object is made to go straight ahead.

6. The recording medium according to claim 5, wherein, the program causing the information processing device to perform functions comprises:

a player moving image accepting means that accepts an input of a player moving image obtained by taking images of the player by the image pickup device; and a mirrored moving image processing means that generates the mirrored moving image by subjecting the player moving image to mirroring.

7. The recording medium according to claim 5, wherein, the display control means subjects the mirrored moving image to a translucent process, and superimposes the mirrored moving image and the computer image.

8. The recording medium according to claim 5, wherein, the control means includes a display in the computer image, serving as guidance for the player regarding the traveling direction of the object.

9. An object control method for an information processing device, comprising:

a detection process that detects an area where there is motion, from a mirrored moving image of a player based on a difference of the mirrored moving image between frames;

a control process that generates a computer image including an object targeted for moving; and a display control process that allows a display device to display a superimposed moving image obtained by superimposing the mirrored moving image and the computer image; wherein, the control process sets multiple detection target areas concerning the object targeted for moving, and controls a movement mode of the object, in response to a detection result of the motion of the mirrored moving image in an area corresponding to each of the detection target areas, wherein, with regard to two detection target areas among the multiple detection target areas, the control process decides a traveling direction in such a manner that when motion is detected in one of the detection target areas, the object is made to proceed toward the other detection target area side, and when motion is detected in both of the detection target areas, the object is made to go straight ahead.

* * * * *